United States Patent Office 3,108,667
Patented Oct. 29, 1963

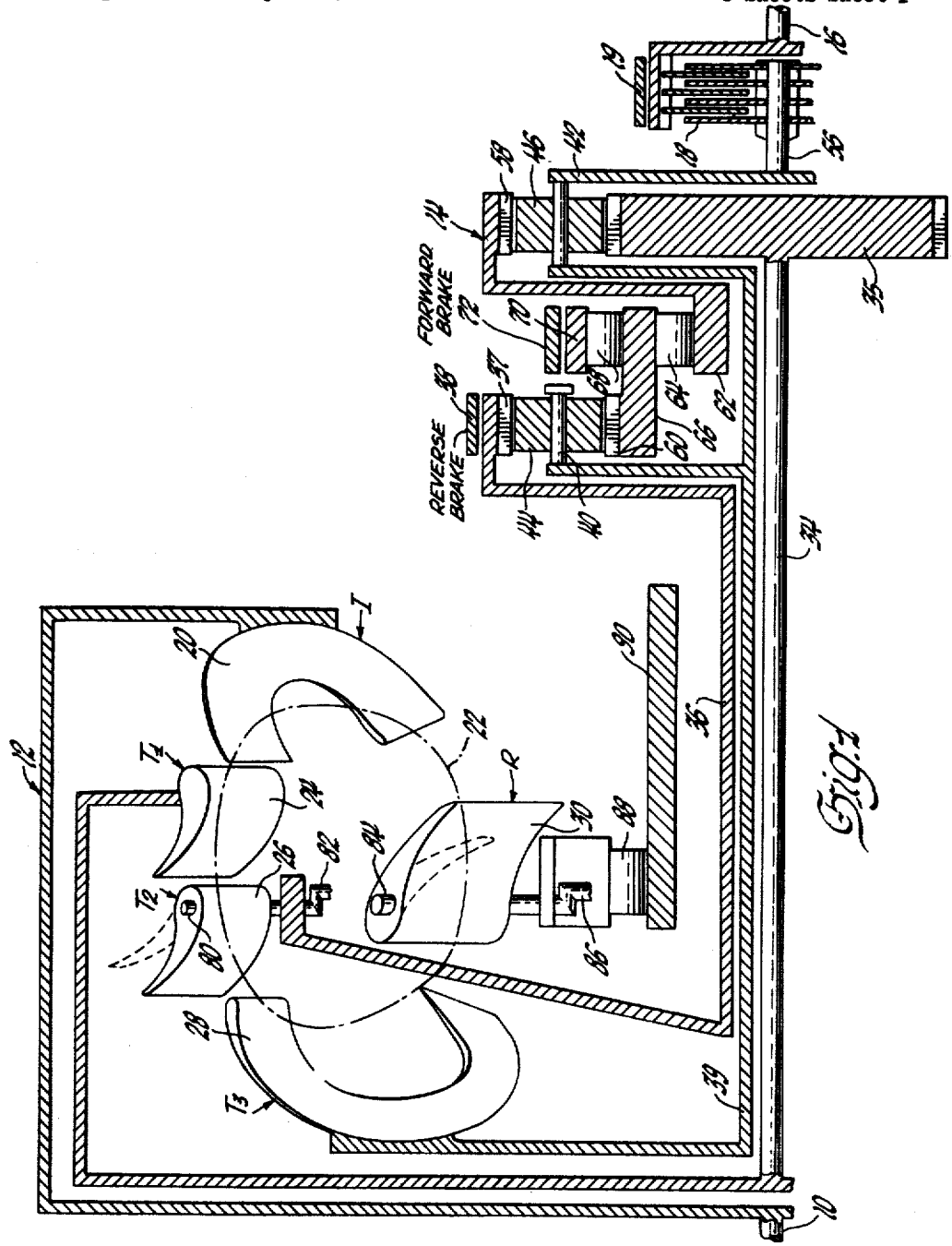

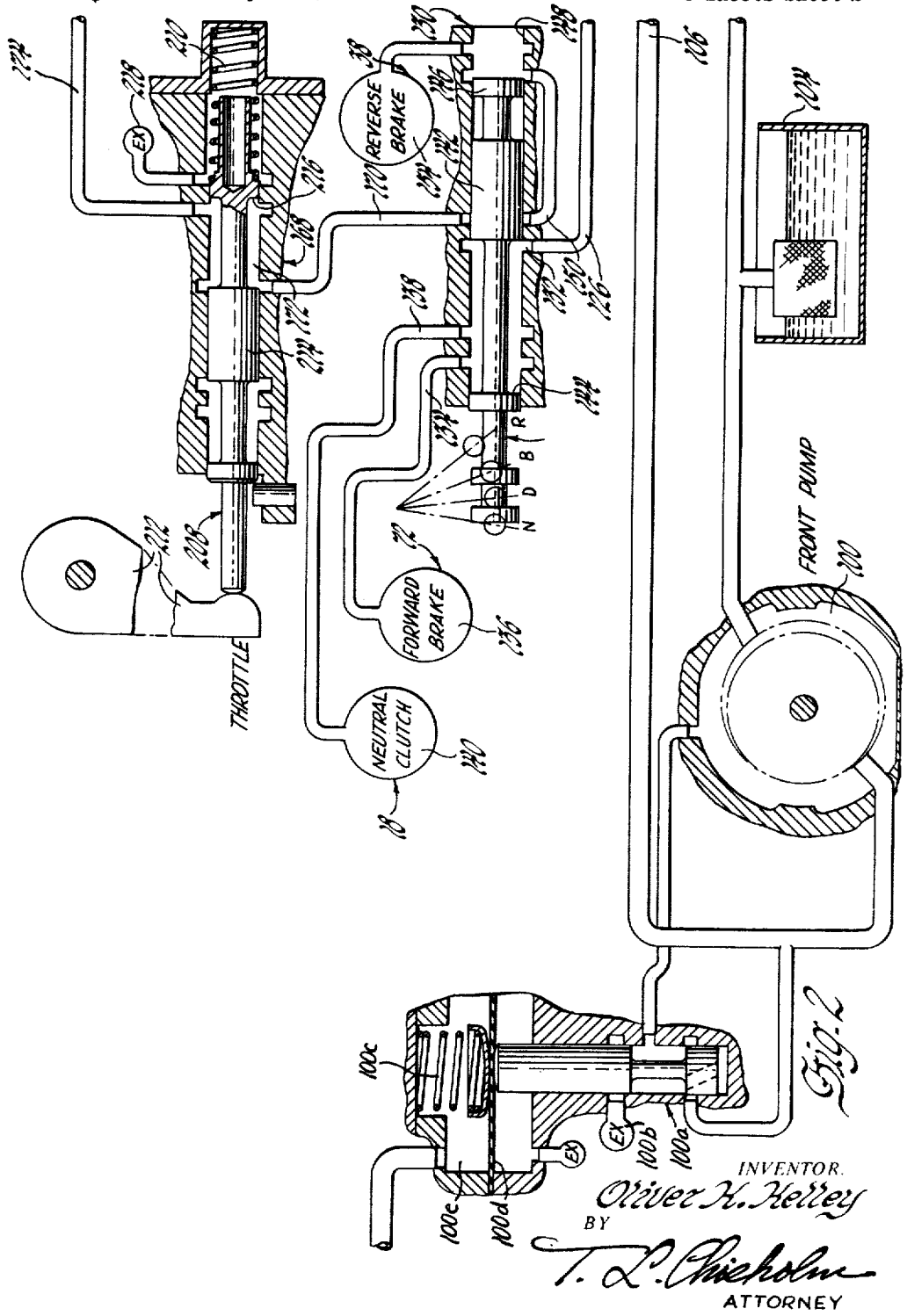

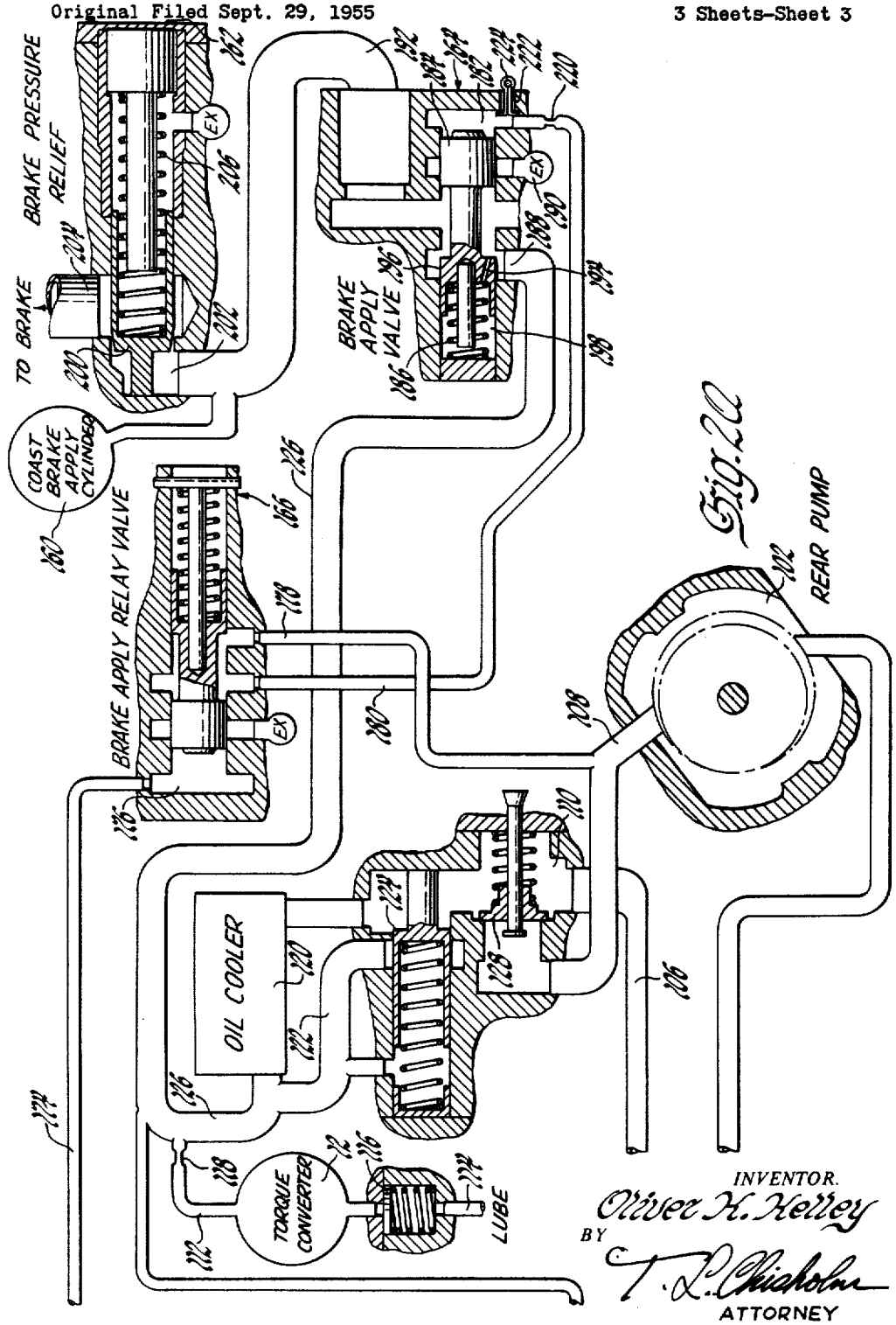

3,108,667
BRAKE CONTROL SYSTEM
Oliver K. Kelley, Bloomfield Hills, Mich., assignor to General Motors Corporation, Detroit, Mich., a corporation of Delaware
Continuation of application Ser. No. 631,142, Dec. 28, 1956, which is a division of Ser. No. 537,472, Sept. 29, 1955. This application July 28, 1961, Ser. No. 129,199
17 Claims. (Cl. 192—3)

This application is a continuation of my application S.N. 631,142 filed December 28, 1956, now abandoned, which was a division of my application S.N. 537,472 filed September 29, 1955.

This invention relates to improvements in vehicle brakes and braking control systems, especially to those incorporated in motor vehicle transmissions.

Driving in present day traffic congestion frequently requires rapid acceleration followed immediately by sharp braking. This makes high demands on the service brakes of the car and the physique of the driver. It has been proposed to apply brakes automatically in response to closing of the engine throttle, for example in the patent to Furness et al. 1,743,128 dated January 14, 1930, and in the patent application of Howard W. Christenson, Serial No. 721,058, the effective filing date of which is February 16, 1953. However, such devices which have come to my attention while operating satisfactorily within their inherent limitations have not been capable of adjusting the force of application of the brakes to braking requirements, as indicated by the speed of the vehicle.

The objects of the invention include the provision of an improved and independent car brake and a braking control which is so combined with the usual driving controls that the brake may be set automatically whenever deceleration is desired, for example whenever the engine throttle is closed, and to apply the brake with a force measured by car speed.

Other objects are to apply the brake with a constant force whenever the car is moving above a predetermined relatively high speed, to reduce the braking effort as the car speed is reduced below such predetermined speed, and to remove the brake entirely at a predetermined low speed, herein called minimum braking speed. This assists in achieving gradual and smooth stops. The invention includes means for preventing application of the brake if the throttle is closed when the car is moving slowly and means for disabling the automatic control entirely so that the brake is not applied under any conditions. The brake is intended to be independent of the customary foot-operated service brakes, and may be conveniently incorporated in an automatic transmission and operated by the hydraulic controls for such transmission.

The foregoing and other objects and advantages of the invention will be apparent from the annexed description and from the accompanying drawings, in which:

FIG. 1 shows schematically one-half of a symmetrical longitudinal section of a transmission and brake embodying one form of my invention; and FIGS. 2 and 2A together constitute a schematic hydraulic control diagram for the transmission and brake.

*General Diagrammatic Arrangement*

Referring to FIG. 1, an exemplary transmission includes an input shaft 10 driving a hydrodynamic torque converter 12 which in turn drives planetary reduction gearing 14 which can be connected to a propeller shaft or final drive shaft 16 by a neutral clutch 18. The final drive shaft has a slippable coast or hill brake 19.

The torque converter includes a pump or impeller I of generally known form, represented diagrammatically in FIG. 1 by a single blade 20, rotated by the input shaft 10 and circulating working liquid in a closed toroidal path, the center line of which is represented by the dotted line 22 in FIG. 1.

In my invention I include a first turbine $T_1$ represented in FIG. 1 by a single blade 24, a second turbine $T_2$, represented by blade 26, a third turbine $T_3$, represented by blade 28 and a reaction member R, represented by blade 30. The liquid from the pump I flows successively through $T_1$, $T_2$, $T_3$ and R.

The first turbine $T_1$ is connected to a first transmission input shaft 34 to drive a rear input sun gear 35 of the planetary gearing. The second turbine $T_2$ is connected to a second transmission input shaft 36 to drive a front input ring gear 37, which can also be braked to ground by a reverse reaction brake 38. The third turbine $T_3$ is connected by a third transmission input shaft 39 to drive front and rear carriers 40 and 42, which respectively support front planetary pinions 44 meshing with the front input ring gear 37, and rear planetary pinions 46 which mesh with the rear input sun gear 35. The $T_3$ shaft 39 forms the principal drive shaft of the transmission and through the carrier 46 is connected to the transmission output shaft 56 which drives the final drive shaft 16 through clutch 18. A reaction ring gear 58, meshing with planet pinions 46 completes the rear planetary unit of the reduction gear, and a reduction sun gear 60, meshing with the front planet pinions 44, completes the front planetary unit.

The rear reaction ring gear 58 is connected to the hub or inner race 62 of an inner one-way clutch or ratchet device having one-way ratchet members, such as sprags or rollers 64, mounted inside of an intermediate hub 66, which forms the outer race for ratchet members 64, and also forms a hub or inner race for an outer one-way clutch or ratchet device having outside sprags or rollers 68 which an outer race 70 which can be held against rotation by a forward drive reaction brake 72. The intermediate race 66 is connected to the front reaction sun gear 60, and may be formed integral with it. The arrangement of the one-way clutches is such that when the forward drive reaction brake 72 is set, the hub 66 and the reaction sun gear 60 are prevented from turning backward by the ratchet members 68, and the hub 66 and ratchet members 64 in turn prevent the race 62 and reaction ring gear 58 from turning backward. In one condition of operation the ring gear 58 turns forward while the reaction sun gear 60 is held stationary, and under another condition both the ring gear and sun gear turn forward. Under another condition of operation, reverse drive, the front sun gear 60 is positively driven backward by the rear ring gear 58, the forward reaction brake 72 being released, as will be explained.

As used herein the terms one-way clutch and ratchet device are synonymous and means any device between two relatively rotatable members which permits one of the members to rotate in one sense with respect to the other member but prevents the first member from rotating in the opposite sense with respect to the second. If the first member tends to rotate in the opposite sense with respect to the second member, the ratchet device locks the two members together. This device is sometimes called a freewheeler. If one of the members cannot rotate, the device becomes a one-way brake, a term used herein to denote a species of one-way clutch. This nomenclature is used to avoid the confusion sometimes encountered in the definitions of one-way brake and one-way clutch. In the structure described herein the freewheelers 62—64—66 and 66—68—70 are both generically one-way clutches. Both freewheelers 66—68—70 and 62—64—66 always function as the species one-way brake when the forward brake 72 is set. However, when the forward brake 72 is released, and the reverse brake 38 is set, the ring gear 58 drives the sun gear 60 through the freewheeler 62—64—66, which functions as a one-way clutch generically, but not as a one-way brake specifically.

Operation of General Arrangement

The structure as so far described operates as follows:

Assume that the input shaft 10 is driven by the engine of an automobile whose propeller shaft is the final drive shaft 16, that the neutral clutch 18 is engaged, and that the car is standing with the engine idling.

The forward drive brake 72 is set, the reverse brake 38 being released. As the throttle is opened to drive the engine faster, the transmission drives the output shaft 16 at progressively increasing speed, as more fully explained in my parent application referred to and in British Patent 799,033.

For reverse drive, forward brake 72 is released and reverse brake 38 is set to hold front ring gear 37 to act as a reaction gear. Incidentally, this holds $T_2$ stationary during all reverse drive. Now $T_1$ drives rear input sun gear 35 forward, which because the carrier 42 is initially held by the stationary car, drives the rear ring gear 58 backward, and through the inner one-way clutch 66—64—62 tends to drive the front sun gear 60 backward. This is permitted in fact, for although the outer one-way brake 70—68—66 tends to lock, its race 70 can turn backward, being unopposed by the brake 72. Consequently, the front sun gear 60, rotating backward, drives the car backward.

Control System

The structure described above can be operated by any suitable controls which select forward and reverse and include the usual fuel control for the engine. One example of controls embodying my invention is shown collectively and diagrammatically in FIGS. 2 and 2A.

In general this control system includes two sources of incompressible liquid under pressure, one operative whenever the engine is running, and one operative whenever the car is running forward; a manually operable selector valve for selecting forward without braking, neutral, reverse and forward with permissible braking; and a relay valve for preventing brake operation unless the throttle is closed.

The source of pressure operative whenever the engine is running is the front pump 100 of positive displacement type of known form shown in FIG. 2. This may be of the variable volume vane type and it includes, or is associated with suitable controls which together with the pump itself provide a substantially constant pressure, which pressure however, may be increased if desired with increasing torque demand on the engine, for example, as disclosed in FIG. 16 of U.S. Patent 2,763,162, the disclosure of which is incorporated herein by reference. The pressure of the front pump may be held substantially constant at a given torque demand by the pressure regulator valve 100a of known form, which relieves to an exhaust port 100b, pressure above the value determined by a spring 100c. The effective force of the spring on the valve stem may be modified by a diaphragm 100d enclosing a chamber 100e connected to the induction manifold of the engine. The source of pressure operative when the car is running forward is the rear pump 102 shown in FIG. 2A. This may be similar in construction and operation to the front pump, except that it includes or is associated with suitable controls which together with the pump itself provide a pressure which increases with increasing car speed up to a predetermined relatively high speed and becomes substantially constant at higher speeds. This predetermined high speed may be the rear pump over-control speed, that is, the speed at which the pressure of the rear pump just exceeds the pressure of the front pump so that a check valve such as 128 in FIG. 2A is opened to permit the rear pump alone to supply the entire control system as is known in the art. Alternatively, the objective of supplying a constant braking pressure above a predetermined car speed may be achieved by pressure in a circuit separate from the rear pump, which pressure may be relieved above a constant value, as will be explained.

Referring to FIGS. 2 and 2A, both pumps take in oil from a common sump 104 and their outlets 106 and 108 discharge into a common pressure supply chamber 110 connected, through apparatus to be described, to the converter supply passage 112. Oil leaving the torque converter 12 passes to the lubrication conduit 114 through a pressure relief valve 116 which maintains the desired pressure below main line pressure in the converter. Oil enters the converter only through the restriction 118, which may be constituted by conduit 112 itself, so that the pressure in the converter does not rise above the desired value. The converter charging conduit 112 is connected to the pressure supply chamber 110 both through a cooler 120 and a by-pass conduit 122 which latter is controlled by a pressure-responsive by-pass or relief valve 124 which opens at a predetermined pressure to direct a portion of the oil around the cooler to the main control conduit 126 into which the cooler also discharges. The rear pump 102 discharges to the pressure supply chamber 110 and hence to main line 126 only through check valve 128 so that it supplies oil to the system as a whole only when the pressure of the rear pump exceeds the pressure of the front pump, as is known, and the front pump cannot supply oil to that part of the control system intended to respond only to forward motion of the vehicle.

A manual selector valve 130 at the right of FIG. 2 is supplied with control oil from the main line 126 at inlet port 132. When the manual valve is in the D position shown in FIG. 2, it supplies oil by a forward drive conduit 134 to any suitable hydraulic cylinder 136 which is mechanically arranged in any known manner to apply the forward reaction brake 72. The manual valve also supplies oil by a neutral clutch conduit 138 to a hydraulic cylinder 140 which engages the neutral clutch 18. This conditions the control system to drive the car forward. If the selector valve 130 is moved one position to the left, namely to the N position indicated in FIG. 2, the land 142 in the center of the valve stem blocks the main line supply port 132 and the left land 144 moves out of the valve casing to vent both forward drive and neutral clutch lines 134 and 138, releasing forward reaction brake and neutral clutch and placing the transmission in neutral. If the manual valve 130 is moved to the position indicated by R in FIG. 2 the land 142 opens the main line supply port 132 and the land 144 is placed between lines 134 and 138 venting the forward reaction brake line 134 but maintaining pressure in the neutral clutch line 138. Also the right-hand land 146 is positioned in the end of the casing, closing the exhaust opening 148, and the land 142 uncovers a connection 150 which conducts oil from the intake port 132 to the space between lands 142 and 146 to supply a hydraulic cylinder 154 which applies the reverse reaction brake 38 of FIG. 1. This conditions the transmission for reverse drive.

Braking

The control system includes means for operating the coast or downhill brake 19. A hydraulic cylinder 160 (FIG. 2A) is connected to apply the brake 19 of FIG. 1 in any known way. The brake apply cylinder 160 is filled by oil under pressure from the main line 126 under the joint control of a brake pressure, a brake apply valve 164, and a brake apply relay valve 166, a check valve 128 and a brake pressure relief valve 162, all shown in FIG. 2A and a throttle brake valve 168, and the manual valve 130 shown in FIG. 2. The brake cannot be set unless these conditions exist; the manual valve is in braking position B in FIG. 2, and the throttle is closed, and the car is moving forward above a predetermined speed, herein called the minimum braking speed, which is less than the rear pump over-control speed, as will be explained.

When the manual valve is in B position the forward brake and neutral clutch remain energized, and the land 146 is between connection 150 and the reverse cylinder 154 so that the car can be driven forward in the normal manner as long as the throttle is open slightly. Also, when the valve is in B position the land 142 uncovers a brake control supply conduit 170 which is then supplied with control oil from the main line 126 at port 132. If the throttle is closed, as is shown in FIG. 2, this oil flows from the main line through chamber 172 of throttle brake valve 168 and through conduit 174 to the actuating chamber 176 of relay valve 166 to open this valve as is shown in FIG. 2A. This allows oil from the rear pump outlet 108 to flow by conduit 178 to conduit 180 which delivers it to the operating chamber 182 of the brake apply valve 164. If the car is moving forward above the predetermined minimum braking speed, pressure of the rear pump in chamber 182 is sufficient to open the brake apply valve by moving the valve stem 184 to the left as FIG. 2A is viewed, against the force of a restoring spring 186. This opens inlet 188 from main line 126 and closes exhaust port 190. This admits oil to brake apply conduit 192 to apply the brake 19 by pressurizing the cylinder 160. Brake apply valve 164 is also a brake pressure regulating valve.

As soon as oil is admitted at port 188 it flows through an opening 194 in land 196 and into presure regulating chamber 198 which urges the valve to move toward the right. This tends to close inlet port 188 and open slightly exhaust port 190. This causes the valve to alternate or hover between one position in which inlet 188 is opened and exhaust 190 is closed and another position in which the inlet is closed and the exhaust is opened slightly. This maintains the brake apply pressure in conduit 192, as is known, at a value measured by the rear pump pressure in chamber 182.

At some predetermined braking pressure the brake may be cooled and lubricated by a relief valve 162 connected to the conduit 192. This may be a pressure relief valve of any known form, for example including a throttle valve 200 connected between an inlet 202 which is connected to conduit 192 and an outlet 204. The valve is urged closed by a spring 206 and urged open by the pressure in the conduit 192 to spill excess oil to outlet 204.

This arrangement maintains a substantially constant transmission pressure in the main line 126 and a lower brake operating pressure in the apply cylinder 160 while maintaining excess flow capacity in the line 192. The excess is passed through outlet 204 to cool the brake 18 before returning to sump 104.

The entire braking system is made selectively operative or inactive by the closed throttle relay valve 168. This includes a valve stem 208 urged to the left into the position shown in FIG. 2 by a spring 210, and movable against the spring by an arm 212 connected to the throttle of the engine of the car. FIG. 2 shows the arm 212 when the throttle is closed. In this position control oil is supplied to conduit 174 and to the brake system through the valve chamber 172 as above described, but whenever the throttle is opened, even slightly, to drive the car, a land 214 on valve stem 208 cuts off the oil supply to the brake control system by closing conduit 170 and at the same time a land 216 on the valve stem opens an exhaust port 218 and drains chamber 176 of brake apply relay valve 166 to prevent application of the brake or to release the brake if it is already applied. Also, the brake control system is inactivated whenever the manual valve is in drive or neutral position, in either of which positions the land 142 of the manual valve prevents communication between the main line 126 and the brake control conduit 170 and vents conduit 170 through connection 150 to exhaust port 148. Although the brake control conduit 170 can be filled when the manual valve is in reverse position, the brake system cannot operate because when the car is not moving forward the rear pump furnishes no pressure and the brake apply valve 164 is closed, preventing oil from the main line 126 from entering conduit 192 to supply the brake apply cylinder 160.

It is intended that the coast brake in general operation will either be fully off or fully applied by a constant force which is normally determined by the relief valve 162. For city driving which may consist mainly of acceleration and deceleration, the car may be operated with the manual valve in brake position so that the coast brake will automatically assist in stopping the car whenever the throttle is closed. This makes it desirable to release the brake gradually on coming to a stop. For this purpose the brake apply valve 164 also acts as a pressure regulating valve for reducing the pressure in the brake apply cylinder 160. The rear pump provides in chamber 182 a constant pressure whenever the car is running above the rear pump over-control speed, but as the car slows down below this speed the pressure supplied by the rear pump gradually decreases due to the effect of a restricted bleed orifice 222, as is known.

Consequently, whenever the car slows down below this over-control speed, the valve 164 reduces pressure in the brake apply cylinder 160 gradually as the car comes to a stop. Since the car is being braked to some extent as long as the valve 164 can open to supply pressure, as above described, and because this valve is opened only by the pressure of the rear pump, which must be above the minimum braking speed to open the valve 164 or hold it open, minimum braking speed is lower than over-control speed. When the car slows to minimum braking speed the pressure of the rear pump is too low to open the valve 164 against the force of spring 186. Consequently the valve will close and the brake will be released.

In order to maintain the effect of the bleed opening 222 constant and prevent its becoming clogged with dirt, I place a loose cotter pin 224 in the opening. Movement of the cotter pin due to vibration or car movement tends to keep any dirt from lodging in the opening and to maintain a constant effective size of the opening.

While the rear pump 102 and its associated controls maintains a pressure in chamber 182 which is measured by car speed up to the rear pump over-control speed and maintains a constant speed thereafter, and while this variation of pressure is reflected in the brake apply line 192, the valve 162 is an additional or alternative means of maintaining in the line 192 a pressure which is constant above a predetermined high brake apply pressure, for whenever the brake apply pressure exceeds a value corresponding to the force of the spring 206 the valve 200 opens to relieve excess pressure to the brake lubricating line 204.

I claim:
1. A motor vehicle comprising in combination an engine for driving the vehicle, a throttle for controlling the power of the engine, a vehicle brake for yieldingly opposing movement of the vehicle, a pressure chamber for applying the brake, a pump for fluid pressure driven in response to movement of the vehicle, which pump maintains a pressure which is a measure of vehicle speed up to a predetermined vehicle speed and maintains a constant pressure at higher speeds, a source of fluid at a substantially constant pressure, a normally closed pressure regulating valve which when open connects the source of pressure to the brake applying chamber, a second pressure chamber for opening the valve at a predetermined minimum pressure and regulating the pressure delivered by the regulator valve in accord with the pressure in the second pressure chamber, a conduit connecting the pump to the second pressure chamber, a second normally closed valve which when closed prevents communication through said conduit and when open permits communication through said conduit and means responsive to closing of the throttle for opening the second valve to direct fluid from the pump to the second pressure chamber to open the first valve and apply the brake with a force which is a measure of the pressure of the pump.

2. A motor vehicle comprising in combination an engine for driving the vehicle, a throttle for controlling the power of the engine, a vehicle brake for yieldingly opposing movement of the vehicle, a pressure chamber for applying the brake, a pump for fluid pressure driven in response to movement of the vehicle, which pump maintains a pressure which is a measure of vehicle speed up to a predetermined vehicle speed, a source of fluid at a substantially constant pressure, a normally closed pressure regulating valve which when open connects the source of pressure to the brake applying chamber, a second pressure chamber for opening the valve at a predetermined minimum pressure and regulating the pressure delivered by the regulator valve in accord with the pressure in the second pressure chamber, a conduit connecting the pump to the second pressure chamber, a second normally closed valve which when closed prevents communication through said conduit and when open permits communication through said conduit and means responsive to closing of the throttle for opening the second valve to direct fluid from the pump to the second pressure chamber to open the first valve and apply the brake when the vehicle speed is above a predetermined minimum with a force which is a measure of vehicle speed.

3. A motor vehicle comprising in combination an engine for driving the vehicle, a throttle for controlling the power of the engine, a vehicle brake for yieldingly opposing movement of the vehicle, a pressure chamber for applying the brake, a pump for fluid pressure driven in response to movement of the vehicle, which pump maintains a pressure which is a measure of vehicle speed up to a predetermined vehicle speed, a source of fluid pressure, a normally closed valve which when open connects the source of pressure to the brake applying chamber, a second pressure chamber for opening the valve at a predetermined minimum pressure, a conduit connecting the pump to the second pressure chamber, a second normally closed valve which when closed prevents communication through said conduit and when open permits communication through said conduit and means responsive to closing of the throttle for opening the second valve to direct fluid from the pump to the second pressure chamber to open the first valve and apply the brake when the vehicle speed is above a predetermined minimum with a force which is a measure of vehicle speed.

4. A motor vehicle comprising in combination an engine for driving the vehicle, a throttle for controlling the power of the engine, a vehicle brake for yieldingly opposing movement of the vehicle, a pressure chamber for applying the brake, a source of fluid pressure, a pump for pressure fluid driven in response to movement of the vehicle which pump maintains a pressure which is a measure of vehicle speed up to a predetermined speed, a first normally closed valve for directing fluid pressure from said source to the brake applying chamber, said valve being adapted to be opened by a predetermined minimum fluid pressure, a passage connecting the outlet of the valve with the brake applying chamber, a conduit for conducting pressure fluid from the pump to said valve to urge the valve open and thereby direct fluid under pressure to said passage for applying said vehicle brake, a second normally closed valve which when closed prevents a passage of fluid through said conduit and when open permits passage of fluid through said conduit, and means responsive to closing of the throttle for opening the second valve to apply the brake whenever the vehicle is moving above a predetermined minimum speed.

5. A motor vehicle comprising in combination an engine for driving the vehicle, a throttle for controlling the power of the engine, a vehicle brake for yieldingly opposing movement of the vehicle, and control means for applying the vehicle brake in response jointly to closing of the throttle and to motion of the vehicle above a first predetermined minimum speed substantially above zero, said control means including means for applying the vehicle brake with a constant force whenever the vehicle speed is above a second and substantially higher predetermined speed, means for reducing the braking effort as the speed of the vehicle falls below the second mentioned speed, and means for preventing application of the brake when the vehicle is in motion and not moving above said first predetermined speed.

6. A motor vehicle comprising in combination means for driving the vehicle, a throttle which when opened increases the power of the driving means and when closed decreases power of the driving means, vehicle retarding means which when applied yieldingly opposes movement of the vehicle over a substantially range of normal driving speeds, a pressure chamber which when supplied with fluid under pressure applies the retarding means with a force which is a measure of the pressure of the fluid, a source of fluid under pressure, a pump driven in response to movement of the vehicle, which pump maintains fluid pressure which increases with increasing vehicle speed over a substantial range of speed up to a predetermined speed and remains substantially constant at higher speeds, and control means connected to the chamber and to the pump, which control means operates to connect the source to the chamber to apply the retarding means when the throttle is closed, the control means including means for interrupting the connection between the chamber and the source to release the retarding means in response to motion of the vehicle at a speed below a predetermined value.

7. A motor vehicle comprising in combination means for driving the vehicle, a throttle which when open increases the power of the driving means and when closed decreases the power of the driving means, retarding means which when applied yieldingly opposes motion of the vehicle, a pressure chamber which when supplied with fluid under pressure applies the retarding means with a force which is a measure of the pressure, a source of pressure fluid which is maintained at a substantially constant pressure whenever the vehicle speed is above a predetermined value and control means for connecting the source to the chamber in response jointly to the closing of the throttle and to motion of the vehicle at a speed above a second and lower predetermined value, said control means including means for preventing connection of the source to the chamber in response to motion of the vehicle at a speed below said second predetermined value.

8. A motor vehicle comprising in combination an engine for driving the vehicle, a throttle for controlling the power of the engine, a vehicle brake for yieldingly opposing motion of the vehicle, a pressure chamber for applying the vehicle brake, a pump for pressure fluid driven in response to movement of the vehicle which pump maintains a pressure increasing with, and which is a measure of vehicle speed up to a predetermined speed, and means responsive to pressure of the pump and further responsive to a closing of the throttle for maintaining in the chamber a pressure which is a measure of the pressure of the pump.

9. A motor vehicle comprising in combination means for driving the vehicle, a throttle which when open increases the power of the driving means and when closed decreases the power of the driving means, retarding means for yieldingly opposing motion of the vehicle, a pressure chamber which when supplied with fluid under pressure applies the retarding means with a force which is a measure of the pressure, a source of fluid under pressure, and means for connecting the source to the chamber in response jointly to closing of the throttle and motion of the vehicle at a speed above a predetermined minimum which is substantially above zero speed and disables said connection from the source to the chamber at a speed below said predetermined minimum.

10. A motor vehicle comprising in combination means for driving the vehicle, a throttle which when opened increases the power of the driving means and when closed decreases the power of the driving means, retarding means which when applied yieldingly opposes movement of the vehicle, and means which operates jointly in response to closing of the throttle and to motion of the vehicle above a predetermined speed substantially above zero speed for applying the retarding means and is inoperative at speeds below said predetermined speed.

11. A motor vehicle comprising in combination an engine for driving the vehicle, a throttle for controlling the power of the engine, a vehicle brake for yieldingly opposing movement of the vehicle, and control means for applying the vehicle brake in response jointly to closing of the throttle and to motion of the vehicle above a predetermined minimum speed substantially above zero, said control means including means for applying the vehicle brake with a force which is a measure of the speed of the vehicle over a substantial range of vehicle speed, and means for preventing application of the brake when the vehicle is in motion and not moving above said first predetermined speed.

12. A motor vehicle comprising in combination means for driving the vehicle, a throttle which when opened increases the power of the driving means and when closed decreases power of the driving means, vehicle retarding means which when applied yieldingly opposes movement of the vehicle over a substantial range of normal driving speeds, a pressure chamber which when supplied with fluid under pressure applies the retarding means with a force which is a measure of the pressure of the fluid, a source of fluid under pressure, a pump driven in response to movement of the vehicle, which pump maintains fluid pressure which increases with increasing vehicle speed over a substantial range of speed up to a predetermined speed, and control means connected to the chamber and to the pump, which control means operates to connect the source to the chamber to apply the retarding means when the throttle is closed, the control means including means for interrupting the connection between the chamber and the source to release the retarding means in response to motion of the vehicle at a speed below a predetermined value.

13. A motor vehicle comprising in combination means for driving the vehicle, a throttle which when opened increases the power of the driving means and when closed decreases power of the driving means, vehicle retarding means which when applied yieldingly opposes movement of the vehicle over a substantial range of normal driving speeds, a pressure chamber which when supplied with fluid under pressure applies the retarding means with a force which is a measure of the pressure of the fluid, a source of fluid under pressure, means responsive to movement of the vehicle for maintaining pressure which increases with increasing vehicle speed over a substantial range of speed up to a predetermined speed, and control means connected to the chamber and to the pressure maintaining means operative to connect the source to the chamber to apply the retarding means when the throttle is closed, the control means including means for interrupting the connection between the chamber and the source to release the retarding means in response to motion of the vehicle at a speed below a predetermined value.

14. A motor vehicle comprising in combination an engine for driving the vehicle, a throttle for controlling the power of the engine, a vehicle brake for yieldingly opposing motion of the vehicle, a pressure chamber for applying the vehicle brake, means responsive to movement of the vehicle for maintaining a pressure increasing with vehicle speed up to a predetermined speed and substantially constant at higher speeds, and means responsive to pressure of the last-mentioned means and further responsive to closing of the throttle for maintaining in the chamber a pressure which is a measure of the pressure of the last-mentioned means.

15. A motor vehicle comprising in combination an engine for driving the vehicle, a throttle for controlling the power of the engine, a vehicle brake for yieldingly opposing motion of the vehicle, a pressure chamber for applying the vehicle brake, means responsive to movement of the vehicle for maintaining a pressure increasing with vehicle speed up to a predetermined speed, and means responsive to pressure of the last-mentioned means and further responsive to closing of the throttle for maintaining in the chamber a pressure which is a measure of the pressure of the last-mentioned means.

16. A motor vehicle comprising in combination means for driving the vehicle, a throttle which when open increases the power of the driving means and when closed decreases the power of the driving means, retarding means for yieldingly opposing motion of the vehicle, a pressure chamber which when supplied with fluid under pressure applies the retarding means with a force measured by the pressure, a source of fluid under pressure, means for connecting the source to the chamber in response jointly to closing of the throttle and motion of the vehicle at a speed above a predetermined minimum which is substantially above zero, and means for regulating the pressure in the chamber, said regulating means maintaining a pressure which is a measure of the speed of the vehicle.

17. A motor vehicle comprising in combination means for driving the vehicle, a throttle which when open increases the power of the driving means and when closed decreases the power of the driving means, retarding means for yieldingly opposing motion of the vehicle, a pressure chamber which when supplied with fluid under pressure applies the retarding means with a force which is a measure of the pressure, a source of fluid under pressure, means for connecting the source to the chamber in response jointly to closing of the throttle and motion of the vehicle at a speed above a predetermined minimum which is substantially above zero, and means for regulating the pressure in the chamber, said regulating means maintaining a pressure which is a measure of the speed of the vehicle up to a second predetermined speed above said minimum and maintaining a constant pressure at higher speeds.

References Cited in the file of this patent

UNITED STATES PATENTS 1,743,128     Furness et al.            Jan. 14, 1930

UNITED STATES PATENT OFFICE
CERTIFICATE OF CORRECTION

Patent No. 3,108,667                          October 29, 1963

Oliver K. Kelley

It is hereby certified that error appears in the above numbered patent requiring correction and that the said Letters Patent should read as corrected below.

Column 2, line 28, for "reduction", second occurrence, read -- reaction --; line 38, for "which", first occurrence, read -- within --; column 8, line 23, for "substantially" read -- substantial --.

Signed and sealed this 19th day of May 1964.

(SEAL)
Attest:
ERNEST W. SWIDER

Attesting Officer

EDWARD J. BRENNE
Commissioner of Paten